United States Patent [19]

Sugiyama et al.

[11] Patent Number: 5,537,150

[45] Date of Patent: Jul. 16, 1996

[54] IMAGE PROCESSING APPARATUS AND IMAGE COMMUNICATING APPARATUS

[75] Inventors: Akira Sugiyama, Kawasaki; Yoshio Iizuka, Tokyo, both of Japan

[73] Assignee: Canon Kabushiki Kaisha, Tokyo, Japan

[21] Appl. No.: 53,382

[22] Filed: Apr. 28, 1993

[30] Foreign Application Priority Data

May 1, 1992 [JP] Japan ................................ 4-112773
Jul. 20, 1992 [JP] Japan ................................ 4-192115

[51] Int. Cl.[6] ............................................. H04N 5/46
[52] U.S. Cl. ........................ 348/558; 348/220; 348/445
[58] Field of Search ...................................... 348/555, 556, 348/558, 445, 472, 220, 222, 571, 441, 459, 440; 358/445, 447, 451; 345/200, 127, 132, 138; H04N 7/13, 5/46

[56] References Cited

U.S. PATENT DOCUMENTS

| | | | |
|---|---|---|---|
| 4,574,279 | 3/1986 | Roberts | 345/127 |
| 4,825,291 | 4/1989 | Minura et al. | 348/220 |
| 5,029,007 | 7/1991 | Spicro | 348/556 |
| 5,083,215 | 1/1992 | Hashimoto et al. | 358/451 |
| 5,093,730 | 3/1992 | Ishii et al. | 358/451 |
| 5,132,793 | 7/1992 | Hirahata et al. | 348/556 |
| 5,194,950 | 3/1993 | Murakami et al. | 348/469 |
| 5,301,240 | 4/1994 | Stockum et al. | 348/220 |
| 5,309,241 | 5/1994 | Hoagland | 348/222 |
| 5,327,235 | 7/1994 | Richards | 348/441 |
| 5,341,178 | 8/1994 | Ebihara et al. | 348/441 |

FOREIGN PATENT DOCUMENTS

0113781  4/1990  Japan ............................ H04N 5/46

Primary Examiner—James J. Groody
Assistant Examiner—Jeffrey S. Murrell
Attorney, Agent, or Firm—Fitzpatrick, Cella, Harper & Scinto

[57] ABSTRACT

An image communication apparatus includes circuitry for discriminating a transmission rate of received image data. Control circuitry is also provided for controlling a display process of the received image data in accordance with the transmission rate determined by the discriminating circuitry.

18 Claims, 9 Drawing Sheets

| | X COORDINATE | | | | | | | |
|---|---|---|---|---|---|---|---|---|
| | M+0 | M+1 | M+2 | M+3 | M+4 | M+5 | M+6 | M+7 |
| N+0 | 0.5 | 0.5 | 0.5 | 0.5 | 0.5 | 0.5 | 0.5 | 0.5 |
| N+1 | 0.5 | 1.5 | 1.5 | 1.5 | 1.5 | 1.5 | 1.5 | 0.5 |
| N+2 | 0.5 | 1.5 | 2.5 | 2.5 | 2.5 | 2.5 | 1.5 | 0.5 |
| N+3 | 0.5 | 1.5 | 2.5 | 3.5 | 3.5 | 2.5 | 1.5 | 0.5 |
| N+4 | 0.5 | 1.5 | 2.5 | 3.5 | 3.5 | 2.5 | 1.5 | 0.5 |
| N+5 | 0.5 | 1.5 | 2.5 | 2.5 | 2.5 | 2.5 | 1.5 | 0.5 |
| N+6 | 0.5 | 1.5 | 1.5 | 1.5 | 1.5 | 1.5 | 1.5 | 0.5 |
| N+7 | 0.5 | 0.5 | 0.5 | 0.5 | 0.5 | 0.5 | 0.5 | 0.5 |

Y COORDINATE

BLOCK BOUNDARY

FIG. 8

| | X COORDINATE | | |
|---|---|---|---|
| | x−1 | x | x+1 |
| y−1 | $\gamma$ | $\beta$ | $\gamma$ |
| y | $\beta$ | $\alpha$ | $\beta$ |
| y+1 | $\gamma$ | $\beta$ | $\gamma$ |

Y COORDINATE

FIG. 9

| SMOOTHING-PROCESS RANK | α | β | γ |
|---|---|---|---|
| A | 1/4 | 1/8 | 1/16 |
| B | 1/2 | 1/8 | 0 |
| C | 1 | 0 | 0 |

FIG. 10

| CODING RATE s [Kbps] | DISTANCE FROM BLOCK BOUNDARY | | | |
|---|---|---|---|---|
| | 0.5 | 1.5 | 2.5 | 3.5 |
| $0 < s \leq 128$ | A | A | B | C |
| $128 < s \leq 384$ | A | B | C | C |
| $384 < s$ | B | C | C | C |

FIG. 11

| CODING RATE s [Kbps] | α | β | γ |
|---|---|---|---|
| 0<s≦128 | 1/4 | 1/8 | 1/16 |
| 128<s≦384 | 1/2 | 1/8 | 0 |
| 384<s | 1 | 0 | 0 |

FIG. 12

| DISTANCE FROM BLOCK BOUNDARY | α | β | γ |
|---|---|---|---|
| 0.5 | 1/4 | 1/8 | 1/16 |
| 1.5 | 1/2 | 1/8 | 0 |
| 2.5 | 1 | 0 | 0 |
| 3.5 | 1 | 0 | 0 |

IMAGE PROCESSING APPARATUS AND IMAGE COMMUNICATING APPARATUS

BACKGROUND OF THE INVENTION

1. Field of the Invention

The present invention relates to an image processing apparatus and an image communicating apparatus.

2. Related Background Art

With the spread of a digital public communication line network (what is called an ISDN), a television/telephone and a television conference system have been put into practical use. The International Consultative Committee for Telephone and Telegraph (CCITT) has determined various rules and examinations with respect to audio, video, and data transmissions in such a digital communication line. For instance, the rule H.320 among those rules specifies the whole system aspect of audio/video services. The rule H.221 specifies a frame structure in the audio/video transmission on the channel of 64 kbps to 1920 kbps and a coding allocation of a BAS (Bit-rate Allocation Signal) which is used for exchange of a terminal capability, designation of a communication mode, or the like.

The rule H.242 specifies a protocol for an exchange of a capability among terminals and a switching of the communication mode by the BAS. As for a moving image, the rule H.261 relates to a moving image signal portion of audio video services at a speed of p×64 kbps (p31 to 30) and specifies coding and decoding methods of two video signal formats of CIF (Common Intermedia Format) and QCIF (Quadratic Common Intermedia Format). The QCIF relates to a format such that the CIF is reduced by ½ in the horizontal direction and the number of lines is reduced into ½.

As mentioned above, according to the recommendation (and draft of the recommendation) by the CCITT, after the physical end-to-end of initial channels and the additional channels and the synchronization establishment of each connected channel (the in-channel) is performed, there are specified procedures for: an exchange sequence of the terminal capability by the BAS in the in-channel; a mode switching sequence by the designation of a communication mode, and the like; and a format of image data which is transmitted among terminals. However, a process to change the terminal capability in accordance with situations in each terminal and which communication mode is used in a range of the exchanged capability are out of the range of the specification. An exchanging method between the television signal of the NTSC system or the like and the CIF or QCIF is also out of the range of the specification. Generally, however, one picture plane of the CIF or QCIF format is converted into one picture plane of the NTSC system.

When one picture plane of the CIF or QCIF format is converted into one picture plane of the NTSC, for example, a roughness of an image is conspicuous as compared with that of QCIF.

On the other hand, when a transmission rate of an image is low, a trackability for the motion is bad. When an image is displayed on the whole screen, therefore, stiffness of the motion of the image is conspicuous.

As a method of coding an image, a block coding method whereby one picture plane is divided into a plurality of blocks each consisting of a predetermined number of pixels and pixel data is coded with respect to each block is widely known. According to the block coding method, what is called a block distortion cannot be avoided. The block distortion strongly appears at a position near the block boundary and is weakened as the position is away from the block boundary.

Hitherto, such a block distortion is eliminated by smoothing the decoded pixel values for the whole screen. For example, the pixel values are smoothed by a simple mean, weighted mean, intermediate value, or the like every pixel with reference to the pixel values around the target pixel. Such a smoothing process is uniformly executed irrespective of the pixel position and also independently of a coding rate of a moving image.

On the other hand, a construction such that the presence or absence of a block distortion is checked with respect to the neighboring pixels of the block boundary and, when there is a block distortion, the smoothing process is executed on only those neighboring pixels has been disclosed in JP-A-3-46482.

In case of a moving image, there is a tendency such that, as a coding rate is small, a block distortion of the reproduction image increases. In the conventional apparatus, since a magnitude of the smoothing process has been set to a predetermined level irrespective of a coding rate, there is a drawback such that in case of a large coding rate such that a block distortion hardly occurs, the smoothing process which is stronger than it is needed is executed, so that the reproduction image becomes blurred or, contrarily, when the coding rate is low, the smoothing process is insufficient.

As mentioned above, the block distortion strongly appears at a position near the block boundary and becomes weak as the position moves away from the block boundary. Therefore, when the smoothing process is uniformly performed on the whole picture plane, the image unnecessarily becomes blurred in a portion away from the block boundary.

In the construction disclosed in JP-A-3-46482, although the block distortion of the neighboring pixels of the block boundary can be eliminated, the block distortion of a region near the block boundary cannot be eliminated.

SUMMARY OF THE INVENTION

It is an object of the present invention to solve each or all of the above problems.

Another object of the invention is to provide an image communicating apparatus and an image processing apparatus in which a deterioration of a picture quality of received image data is inconspicuous.

Still another object of the invention is to provide an image communicating apparatus and an image processing apparatus in which a transmission format of received image data can be checked.

To accomplish the above objects, according to a preferred embodiment, there is provided an apparatus comprising: converting means for reducing a received image into an image of a designated size in a display screen; and control means for controlling the converting means in accordance with a transmission rate of the received image, wherein the image transmitted at a high speed by a format of a high resolution is largely displayed in the display screen and, contrarily, the image transmitted at a low speed by a format of a low resolution is displayed small in the display screen, for example, at a size of ½ in both of the vertical and lateral directions. With this method, a stiffness of the motion of the image and a roughness of the image are inconspicuous.

Another object of the invention is to provide an image communicating apparatus having a novel function.

Another object of the invention is to provide an image processing apparatus in which when block coded data is received and displayed, the quality of the image displayed can be improved.

The above and other objects and features of the present invention will become apparent from the following detailed description and the appended claims with reference to the accompanying drawings.

DETAILED DESCRIPTION OF THE PREFERRED EMBODIMENT

A first embodiment of the present invention will be described hereinbelow with reference to the drawings.

Figure 1:
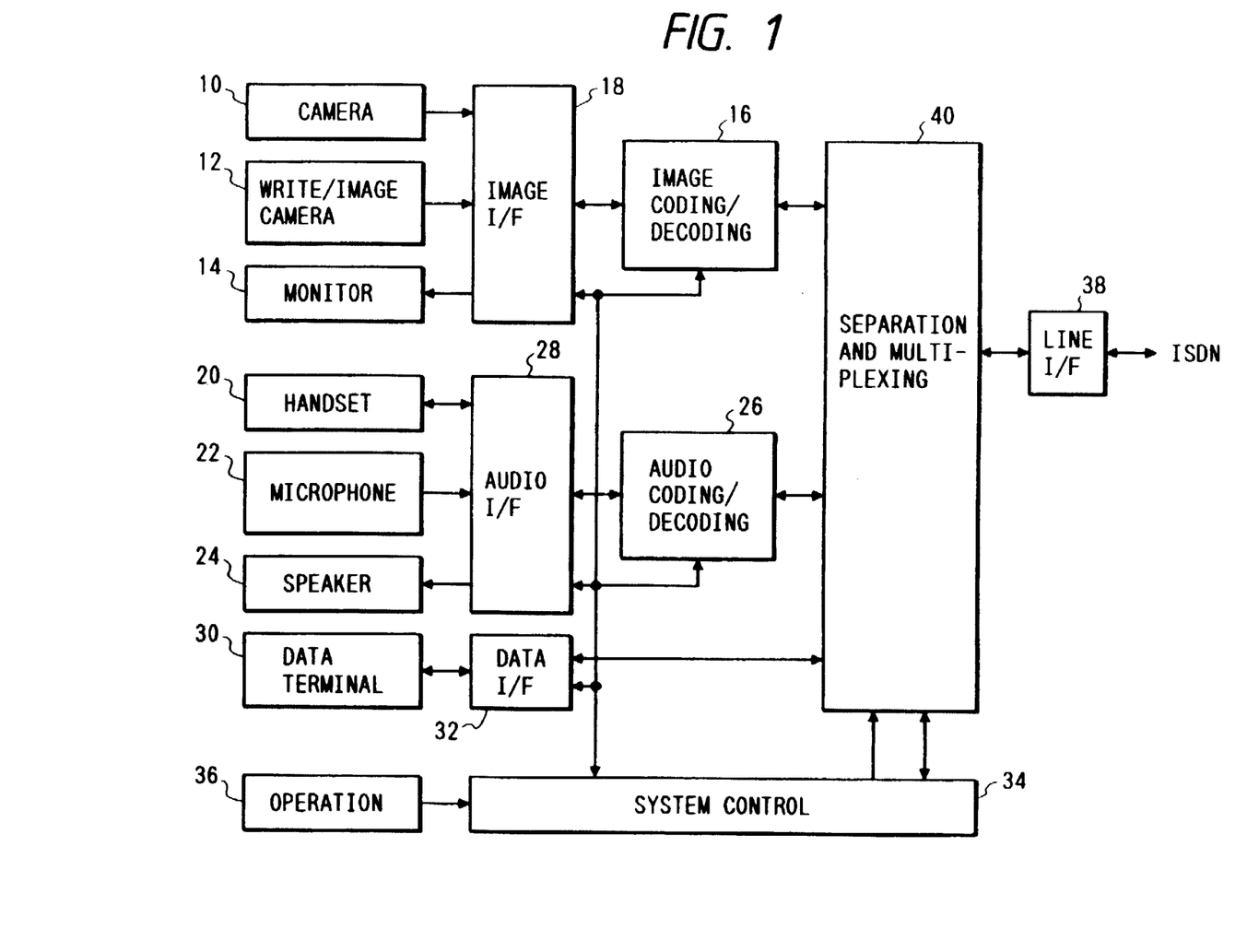
FIG. 1 is a block diagram of a first embodiment of the present invention.

FIG. 1 shows a block diagram of an image/audio/data communication terminal apparatus according to a first embodiment of the present invention. Reference numeral 10 denotes a camera to photograph a user; 12 is a write/image camera to photograph a drawing or reference; 14 is a monitor to display an image; and 16 is an image coding/ decoding circuit for coding an image signal to be transmitted and for decoding the received coded image data. Image interface 18 is provided for selecting either one of outputs of the cameras 10 and 12, for supplying the selected output to the image coding/decoding circuit 16, for synthesizing the received image decoded by the image coding/decoding circuit 16 to input images obtained by the cameras 10 and 12 as necessary, and for outputting a synthesized image to the monitor 14.

As a monitor 14, a single image display apparatus or a plurality of image display apparatuses can be used. Further, even in the case of a single image display apparatus, it is also possible to use an image display apparatus which can display a plurality of images in a plurality of different windows by a window display system.

Reference numeral 20 denotes a telephone handset for talking by a voice; 22 is a microphone to input an audio or voice sound; 24 is a speaker to generate an audio or voice sound; and 26 is an audio coding/decoding circuit for coding an audio signal to be transmitted and for decoding the received coded audio signal. An audio interface 28 to communicate signals among the handset 20, microphone 22, and speaker 24 and the audio coding/decoding circuit 26.

The audio interface 28 executes an on/off-hook detecting process to detect an on-hook state or an off-hook state of the handset 20, an echo cancelling process to cancel an echo when the microphone 22 and speaker 24 are used, and a tone generating process to generate a tone such as dial tone, calling sound, busy tone, terminating sound, or the like.

According to the first embodiment, the audio coding/ decoding circuit 26 codes or decodes an audio signal in accordance with an audio coding decoding algorithm such as 64 kbps PCM A-law, 64 kbps PCM μ-law, 64 kbps/56 kbps/48 kbps SB-ADPCM, 32 kbps ADPCM, 16 kbps (for example, APC-AB), 8 kbps, or the like.

Reference numeral 30 denotes a data terminal to input/ output, display, and process data and 32 indicates a data interface of the data terminal 30.

Reference numeral 34 denotes a system control circuit to control the whole apparatus and 36 indicates an operation unit (for example, ten-key pad, a keyboard, touch panel, etc.) which is used for the user to give a predetermined instruction to the system control circuit 34.

Reference numeral 38 denotes a line interface of a communication line (for example, an ISDN line). Reference numeral 40 indicates a separation and multiplexing circuit for (i) separating and supplying the received information from the line interface 34 to the image coding/decoding circuit 16, audio coding decoding circuit 26, data interface 32, and system control circuit 34 in accordance with the content of the received information, for (ii) multiplexing the coded image data from the image coding/decoding circuit 16, coded audio data from the audio coding decoding circuit 26, data from the data interface 32, and a control command from the system control circuit 34 on a transmission frame unit basis, and for (iii) supplying the multiplexed data to the line interface 38.

Figure 2:
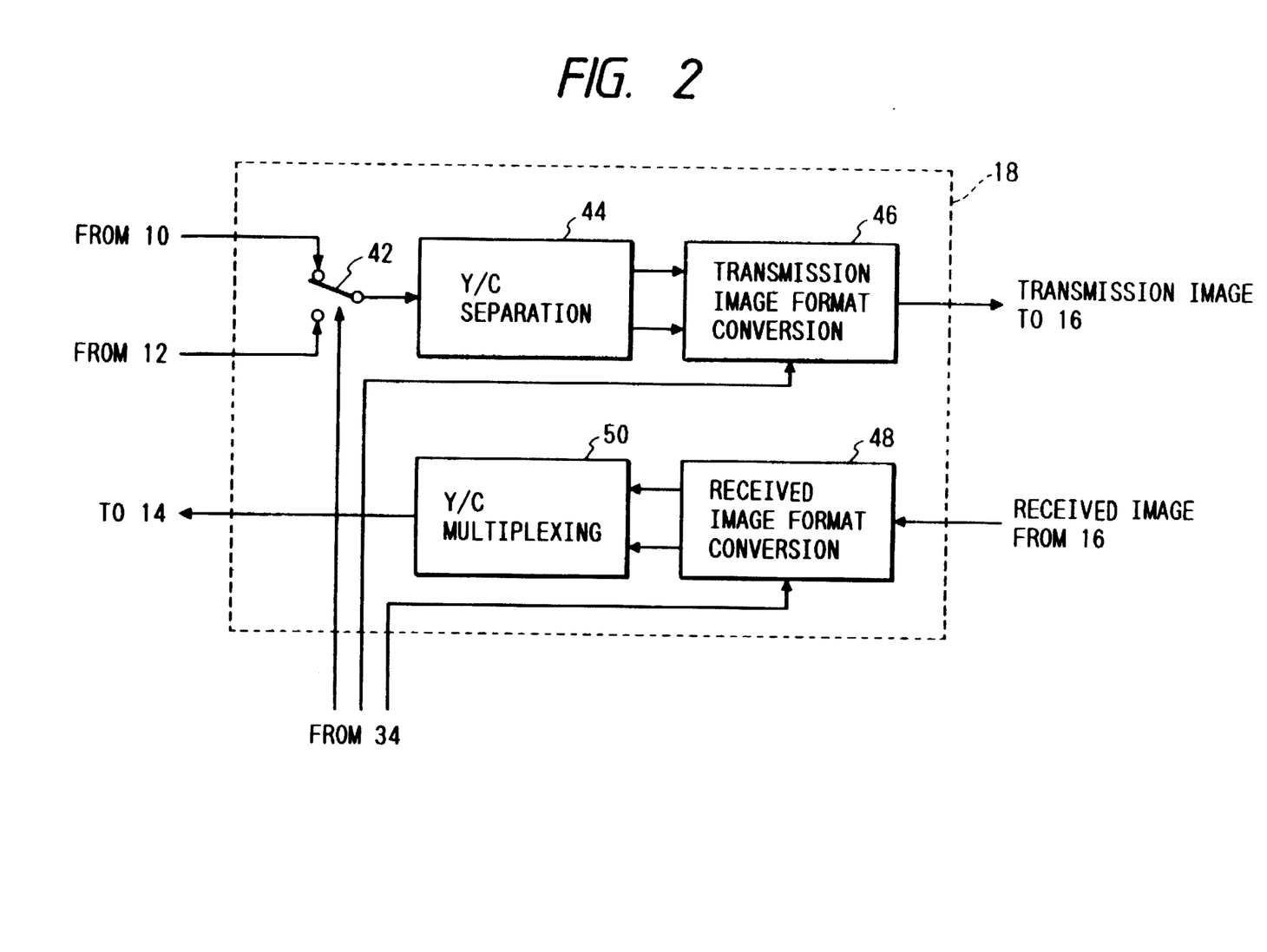
FIG. 2 is a circuit diagram of a format converting portion of an image interface 18 shown in FIG. 1.

FIG. 2 shows a circuit diagram of a format converting portion of the image interface 18. The image interface 18 is also provided with a circuit for supplying image signals from the cameras 10 and 12 to the monitor 14 or to synthesize (for example, picture-in-picture) the input image by the camera 10 or 12 and the received image, and for supplying the synthesized data to the monitor 14.

In FIG. 2, a switch 42 selects either one of the outputs of the cameras 10 and 12 in accordance with a control signal from the system control circuit 34 and supplies the selected output to a Y/C separation circuit 44. The Y/C separation circuit 44 separates the input image signal to a luminance signal Y and color difference signals $C_r$ and $C_b$. A transmission image format conversion circuit 46 converts an output of the Y/C separation circuit 44 into a CIF or QCIF format and supplies it to a coding portion of the image coding/ decoding circuit 16. The system control circuit 34 designates either one of the CIF and QCIF formats and provides the designated format to the transmission image format conversion circuit 46.

The received image signal decoded by the image coding/ decoding circuit 16 is supplied to a received image format conversion circuit 48. The conversion circuit 48 converts the received image data of the CIF or QCIF format into the data of a designated size in the screen of the NTSC system in accordance with a control signal from the system control circuit 34, and supplies the luminance signal Y and the color difference signals $C_r$ and $C_b$ to a Y/C multiplexing circuit 50. The Y/C multiplexing circuit 50 multiplexes the luminance signal Y and the color difference signals $C_r$ and $C_b$ and supplies a composite signal to the monitor 14.

Figure 3:
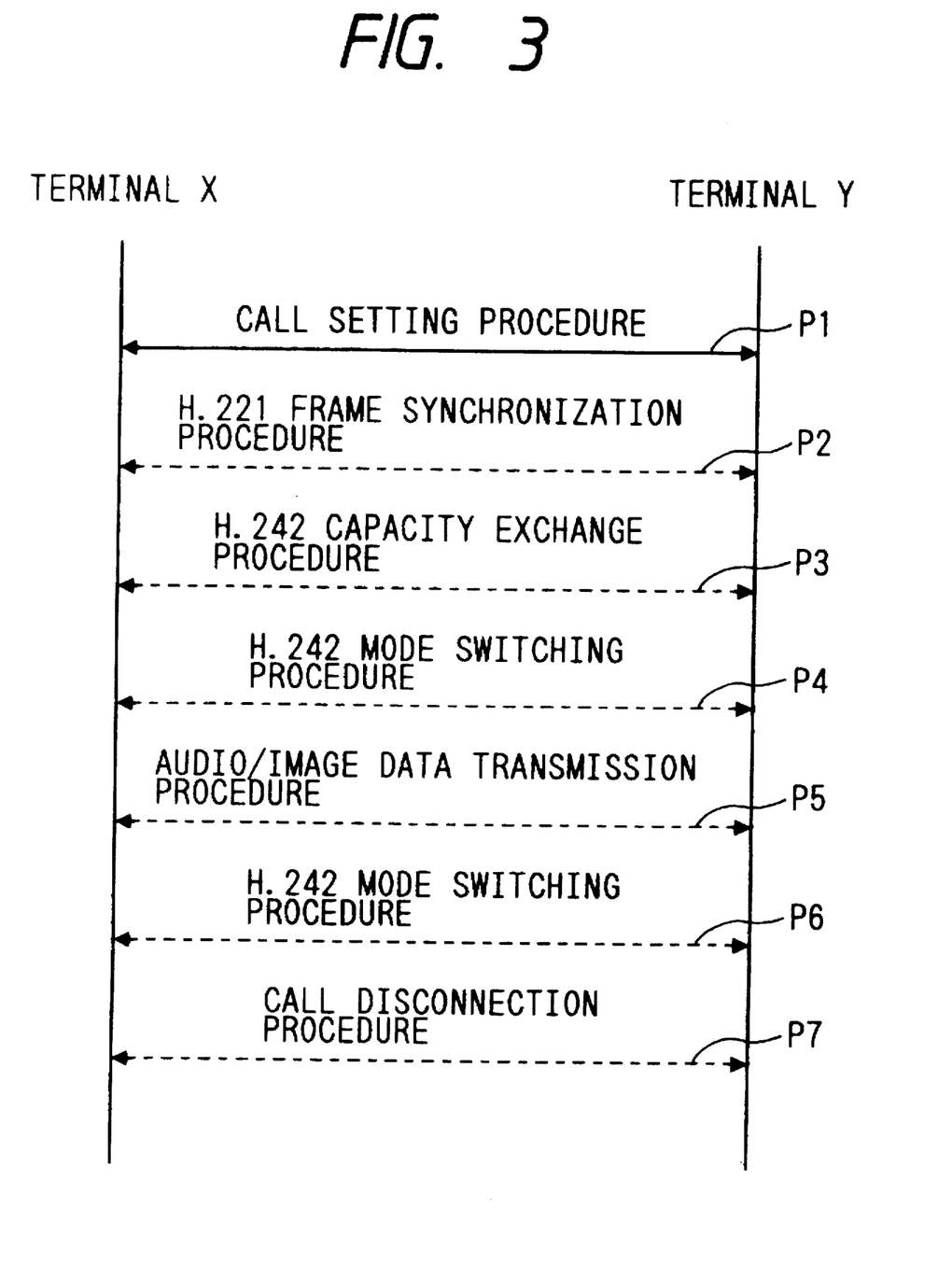
FIG. 3 is a diagram showing a procedure when the communication is started.

FIG. 3 shows a sequence for a procedure to start the communication. Each of a terminal X on the transmission side and a terminal Y on the reception side in the embodiment has a circuit construction shown in FIG. 1. First, a call setting procedure $P_1$ is executed on the D channel in accordance with the ISDN user's interface. Subsequently, a frame synchronization procedure $P_2$ is executed on the set B channel in accordance with the recommendation H.221. After the frame synchronization is established, a capacity exchange procedure $P_3$ is executed by the BAS code in accordance with the recommendation H.242. In the capacity exchange procedure $P_3$, a preset transmission rate of the terminal and a preset terminal capacity of audio, data, or the like are transmitted to a communication partner. And a range of the capacity adapted to the recommendation H.320 between the present terminal capacity and the partner terminal capacity (received from the partner side) is stored in an internal memory of the system control circuit 34 as a communicable capacity in the communication with the partner terminal.

After the capacity is exchanged, a mode switching procedure $P_4$ to designate a communication mode (to actually execute a communication) is executed in a range of the communicable capacity by the BAS code in accordance with the recommendation H.242. In the mode switching procedure $P_4$, a communication mode (such as preset transmission rate of the terminal, audio coding, data rate, and the like) is adjusted within the range of the communicable capacity, and the adjusted communication mode is transmitted to the communication partner as a terminal communication mode. In this instance, the communication partner also transmits the communication mode of the terminal. The system control circuit 34 stores the received communication mode of the communication partner in an internal memory as a partner communication mode.

When the communication modes of the terminal and the partner terminal are established, the actual communication can be executed. An audio/image data transmission procedure $P_5$ (to transmit a video signal) and an audio signal is executed. In the case of changing the communicating capacity or communication mode during execution of the procedure $P_5$, the capacity switching procedure $P_3$ or mode switching procedure $P_4$ is again executed.

In the case of adding an additional channel, the call setting procedure $P_1$ is executed and the frame synchronization procedure $P_2$ is executed on the additional channel. The capacity switching procedure $P_3$ and mode switching procedure $P_4$ are executed as necessary.

In the case of finishing the communication, first, a mode to transmit only the audio signal without transmitting the video signal is set by the H.242 procedure ($P_6$). A call disconnection procedure is subsequently executed ($P_7$).

The system control circuit 34 in the embodiment controls the size in the display screen of the received image in accordance with the transmission rate and the image format upon transmission.

Such a process is executed at the receiving side in case of receiving image data. According to the processes in a television/telephone, however, image data is ordinarily communicated in bidirectionally. While a communication is being executed, image data is always received.

The operation of the embodiment will now be described with reference to the flowcharts.

Figure 4:
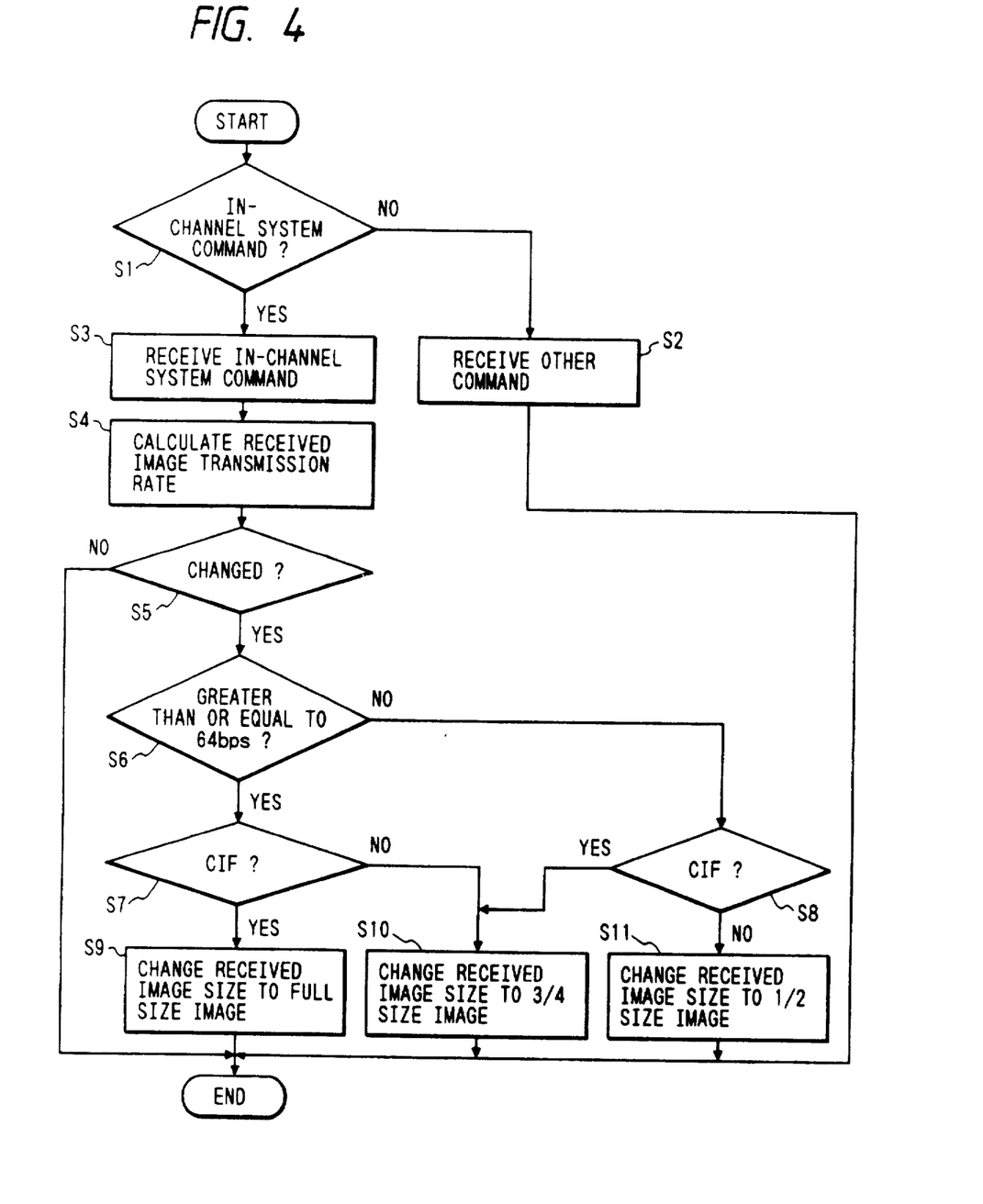
FIG. 4 is an operational flowchart of when a command is received from a separation and multiplexing circuit 40 shown in FIG. 1.

FIG. 4 shows a flowchart for a command receiving process for the separation and multiplexing circuit 40. A processing routine of this flowchart is executed by the procedures $P_3$ and $P_4$ in FIG. 3. In FIG. 4, a check is made to see if the received command is an in-channel system command to notify the mode or capacity (step S1). The in-channel system command is generated by the phases of $P_3$ and $P_4$ in FIG. 3. If NO in step S1, another corresponding command receiving process is executed (S2). In case of the in-channel system command (S1), the process corresponding to the received command is executed (S3). A transmission rate of the received image is calculated from the receiving rate, receiving audio mode, and receiving data mode on the basis of the result in step S3 (S4).

The received image transmission rate is compared with the image transmission rate which has already been stored (S5). If there is no change, the processing routine is finished. When the transmission rate is changed (S5), the received image format conversion circuit 48 of the image interface 18 is controlled in accordance with the transmission rate and the receiving image format CIF or QCIF (S6 to S11).

When the received image format indicates CIF or QCIF, data indicative of such is also outputted in the phases of $P_3$ and $P_4$.

That is, when the image transmission rate is equal to or higher than 64 kbps and the image format indicates CIF (S6, S7), an instruction is generated so as to directly convert the received image into the full-size image of the NTSC format (S9). When the image transmission rate is less than 64 kbps and the image format indicates QCIF (S6, S8), an instruction is generated so as to reduce the received image into ½ in both of the vertical and lateral directions and to thereby convert it into an image of the NTSC format (S11). That is, an instruction is generated so as to reduce the received image by ½ in both of the vertical and lateral directions as compared with the full-size image of the NTSC format. When the transmission rate is equal to or higher than 64 kbps and the image format indicates QCIF (S6, S7) or when the transmission rate is less than 64 kbps and the image format indicates CIF (S6, S8), an instruction is generated so as to convert the full-size image of the NTSC format into an image of ½ size in each of the vertical and lateral directions. When the transmission rate is equal to or higher than 64 kbps and the image format indicates QCIF (S6, S7) or when the transmission rate is less than 64 kbps and the image format indicates CIF (S6, S8), an instruction is generated so as to convert the received image into the a ¾ size image in each of the vertical and lateral directions of the NTSC format (S10). That is, an instruction is generated so as to convert the full-size image of the NTSC format into a ¾ size image in each of the vertical and lateral directions.

Figure 5:
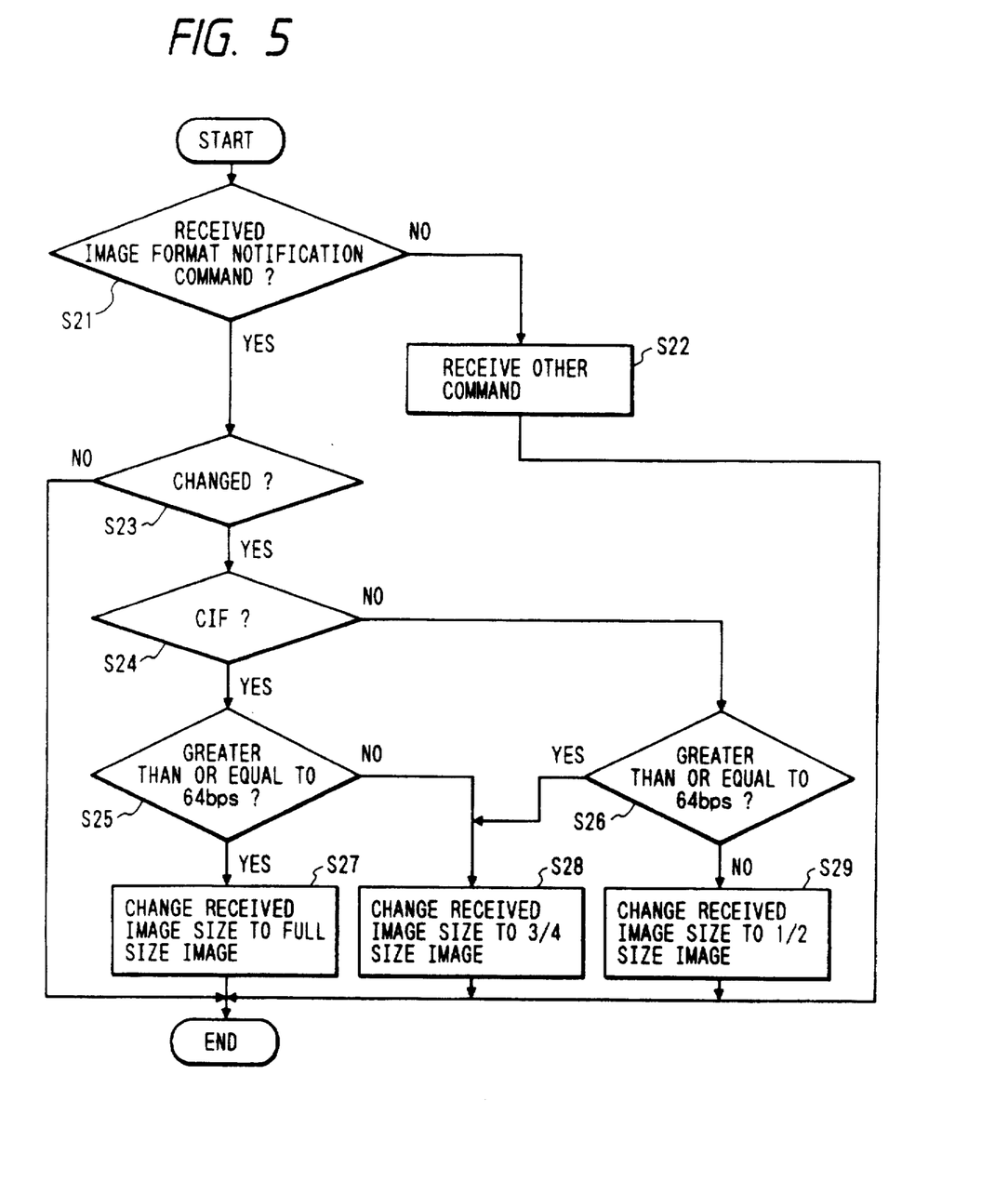
FIG. 5 is an operational flowchart of when a command is received from an image coding/decoding circuit 16 shown in FIG. 1.

FIG. 5 shows a flowchart for a command receiving process from the image coding/decoding circuit 16. The processing routine of FIG. 5 is executed in the procedure $P_5$ in FIG. 3. In FIG. 5, a check is made to see if the received command is a received image format notification command or not (S21). The received image format notification command is outputted in the procedure $P_5$. If NO in step S21, another corresponding command receiving process is executed (S22). In the case of a received image format notification command (S21), the notified received image format is compared with the received image format which has already been stored, thereby judging the presence or absence of a change (S23). If there is no change, the processing routine is finished.

When there is a change (S23), the received image format conversion circuit 48 of the image interface 18 is controlled as follows in accordance with the transmission rate and the received image format CIF or QCIF (S24 to S29).

That is, when the received image format indicates CIF and the image transmission rate is equal to or larger than 64 kbps (S24, S25), an instruction is generated so as to convert the received image as it is into an image of the NTSC format (S27). When the received image format indicates QCIF and the image transmission rate is less than 64 kbps (S24, S26), an instruction is generated so as to convert the received image into the image of an NTSC format of ½ size in each of the vertical and lateral directions (S29). When the image format indicates CIF and the transmission rate is less than 64 kbps (S24, S25) or when the image format indicates QCIF and the transmission rate is equal to or higher than 64 kbps (S24, S26), an instruction is generated so as to convert the received image into an image of the NTSC format of ¾ size in each of the vertical and lateral directions (S28).

In the embodiment, the received image has been converted into an image of the size, ¾ size, or ½ size as examples. However, the image can be also converted into image of another magnification. Further, by variably setting the parameters of the received image format conversion circuit 48, another arbitrary magnification can be used. On the other hand, the threshold value of the transmission rate to change the display size is not limited to 64 kbps, but can be also set to a variable value such as a user designated value.

As will be easily understood from the above description, according to the first embodiment, the received image can be displayed as an image in which a roughness of the image and a stiffness of motion are inconspicuous.

Moreover, in the first embodiment, on the reception side, the user can recognize whether the received image data is based on the QCIF format or the CIF format by observing the size of the received image.

Therefore, when the received image is based on the QCIF format and the quality of the received image is unsatisfactory as a result of the recognition, the user can generate a request for the transmission side to change the transmitted image to the CIF format.

In the embodiment, whether the first size of the received image data is the size of QCIF or CIF has been displayed by changing the size of the displayed image. However, for example, a special display indicating whether the size of the received image data is a size based on QCIF or CIF can be used, or such information can be also overlay-displayed on the received image.

In brief, it is sufficient to discriminate whether the received image is based on the QCIF or CIF while observing the received image, and to obtain such information.

Another embodiment of the invention, in which when a received image is displayed, the quality of the image which is displayed is improved, will now be described.

Figure 6:
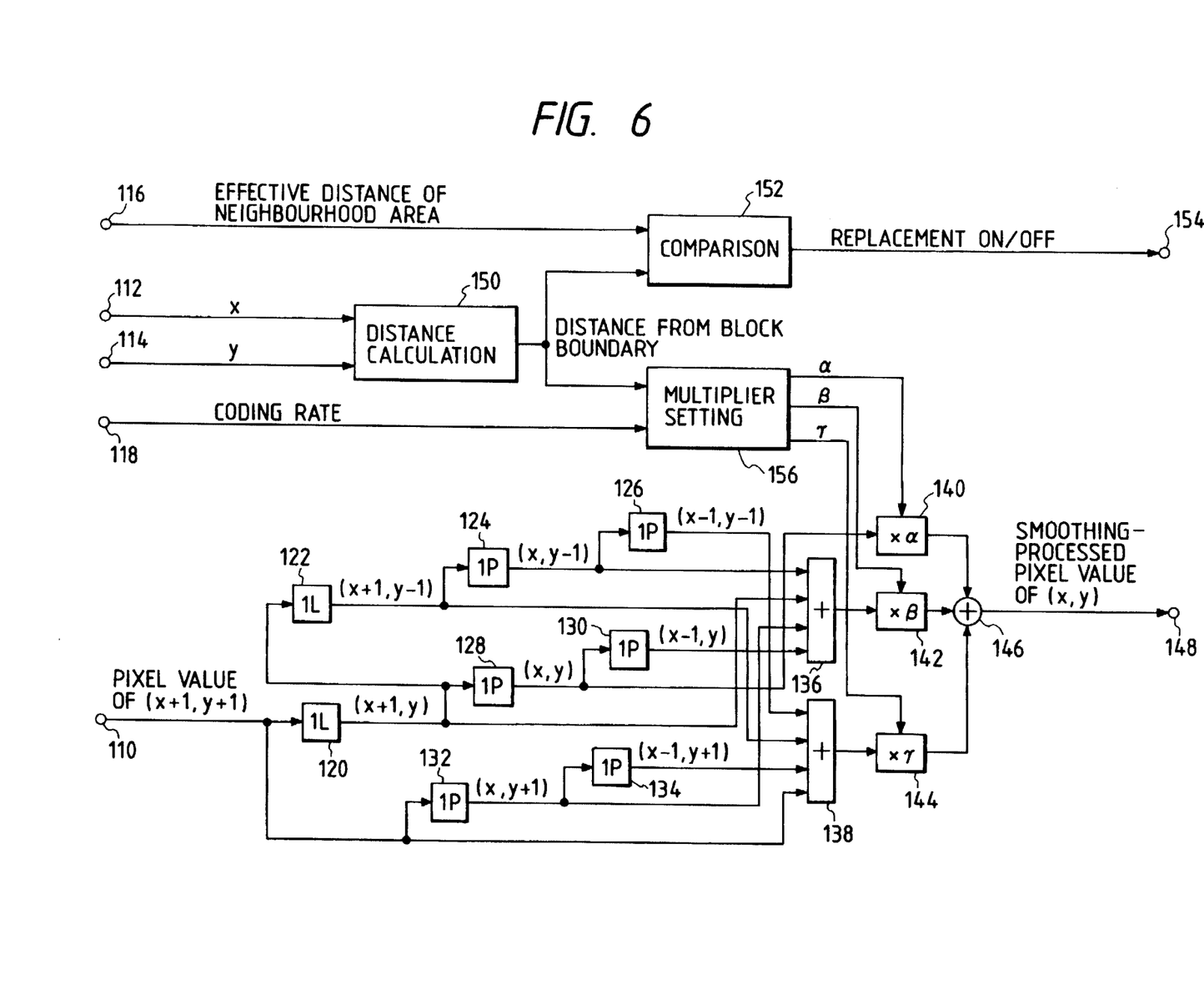
FIG. 6 is a block diagram of a second embodiment of the invention.
Figure 7:
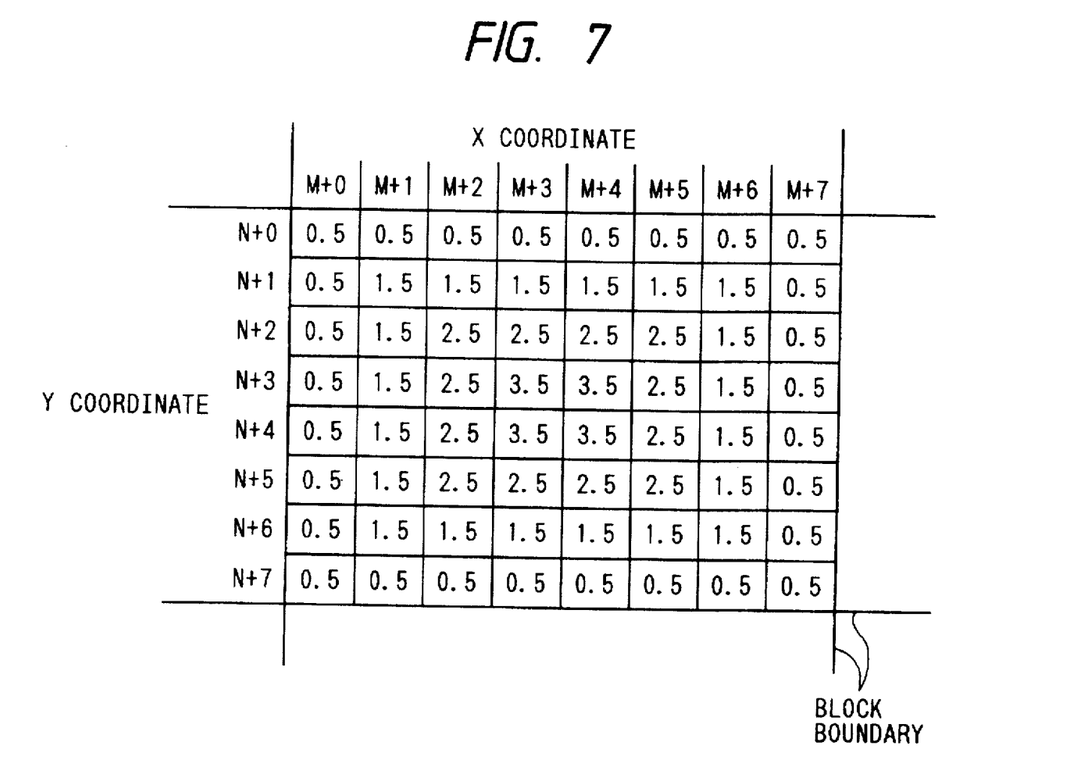
FIG. 7 is a diagram showing values of distances from a block boundary according to the second embodiment.

FIG. 6 is a block diagram of a second embodiment of the present invention. FIG. 7 is a diagram showing a structure of a block and values of distances from the block boundary in the second embodiment.

In FIG. 6, reference numeral 110 denotes a pixel value input terminal to which pixel values are supplied; 112 is an input terminal to which x is supplied when it is assumed that XY coordinates of the pixel value (which is supplied to the pixel value input terminal 110) are set to (x+1, y+1); and 114 is an input terminal to which y is supplied in a manner similar to the case of x. On the screen, the left upper position is set to an origin (0, 0), the horizontal direction is set to X, and the vertical direction is set to Y. Reference numeral 116 denotes an input terminal to which an effective distance value of a neighboring area of the block boundary is supplied, and 118 indicates an input terminal to which data indicative of a coding rate is supplied. The terminal 118 is connected to, for example, the system control circuit 34 in FIG. 1.

Reference numeral 120 denotes a one-line delay circuit to delay the pixel value from the input terminal 110 by a time corresponding to one line; 122 is a one-line delay circuit to delay an output of the one-line delay circuit 122 by a time corresponding to one line; 124 is a one-pixel delay circuit to delay an output of the one-line delay circuit 122 by a time corresponding to one pixel; 126 is a one-pixel delay circuit to delay an output of the one-pixel delay circuit 124 by a time corresponding to one pixel; 128 is a one-pixel delay circuit to delay an output of the one-pixel delay circuit 120 by a time corresponding to one pixel; 130 is a one-pixel delay circuit to delay an output of the one-pixel delay circuit 128 by a time corresponding to one pixel; 132 is a one-pixel delay circuit to delay the pixel value from the input terminal 110 by a time corresponding to one pixel; and 134 is a one-pixel delay circuit to delay an output of the one-pixel delay circuit 132 by a time corresponding to one pixel.

Therefore, an output of the delay circuit 120 indicates the pixel value of the coordinates (x+1, y). An output of the delay circuit 122 indicates the pixel value of the coordinates (x+1, y−1). An output of the delay circuit 124 indicates the pixel value of the coordinates (x, y−1). An output of the delay circuit 126 indicates the pixel value of the coordinates (x−1, y−1). An output of the delay circuit 128 indicates the pixel value of the coordinates (x, y). An output of the delay circuit 130 indicates the pixel value of the coordinates (x−1, y). An output of the delay circuit 132 indicates the pixel value of the coordinates (x, y+1). An output of the delay circuit 134 indicates the pixel value of the coordinates (x−1, y).

Reference numeral 136 denotes an adder to add the outputs of the delay circuits 120, 124, 130, and 132. Reference numeral 138 denotes an adder to add the pixel value from the input terminal 110 and the outputs of the delay circuits 122, 126, and 134. That is, the adder 136 generates the addition value of the pixel values of the coordinates (x, y−1), (x−1, y), (x+1, y), and (x, y+1). The adder 138 adds the pixel values of the coordinates (x−1, y−1), (x+1, y−1), (x−1, y+1), and (x+1, y+1) and generates the addition value.

Reference numeral 140 denotes a multiplier to multiply a coefficient α by the output of the delay circuit 128, namely, the pixel value of the coordinates (x, y); 142 is a multiplier to multiply a coefficient β by the output of the adder 136; 144 is a multiplier to multiply a coefficient γ by the output of the adder 138; and 146 is an adder to add outputs of the multipliers 140, 142, and 144. An output of the adder 146 indicates a new pixel value from which a block distortion of the coordinates (x, y) is eliminated. The output of the adder 146 is supplied from an output terminal 148 to a circuit at the post stage.

Figure 8:
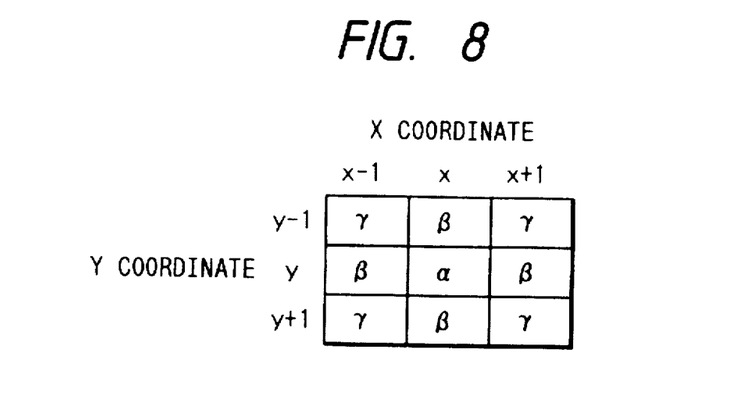
FIG. 8 is a diagram showing coefficients (multipliers) $\alpha$, $\beta$, and $\gamma$ of a two-dimensional spatial filter according to the second embodiment.

The delay circuits 120 to 134, adders 136 and 138, multipliers 140, 142, and 144, and adder 146 comprises a two-dimensional spatial filter. The multipliers α, β, and γ of the multipliers 140, 142, and 144 denote the filter coefficients, and there is a relation among them shown in FIG. 8. However, α, β, and γ are determined so as to satisfy the following equation (1).

$$\alpha + 4 \times (\beta + \gamma) = 1 \tag{1}$$

Figure 9:
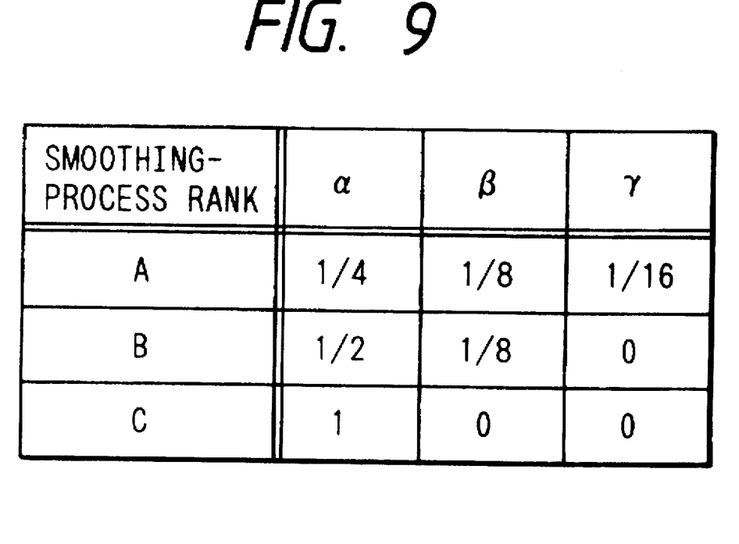
FIG. 9 is a table showing the relations between the ranks A, B, and C of the smoothing process and the coefficients (multipliers) $\alpha$, $\beta$, and $\gamma$.

In the embodiment, three ranks (or levels) A, B, and C are prepared as smoothing processes and the multipliers α, β, and γ are allocated to those three ranks as shown in FIG. 9, respectively. Since each of the multipliers α, β, and γ is set to the value of the power of 2, the multipliers 140, 142, and 144 can be constructed by shift registers, and it is economical and the process can be performed at a high speed.

Reference numeral 150 denotes a distance calculation circuit to calculate the distance from the block boundary in accordance with the values of x and y which are supplied from the input terminals 112 and 114. Reference numeral 152 denotes a comparison circuit to compare the effective distance of the neighboring area which is supplied from the input terminal 116 and the distance from the boundary that is generated from the distance calculation circuit 150. The result of the comparison of the comparison circuit 152 is supplied from an output terminal 154 to a circuit at the post stage as a control signal to control the substitution of the pixel value.

Figure 10:
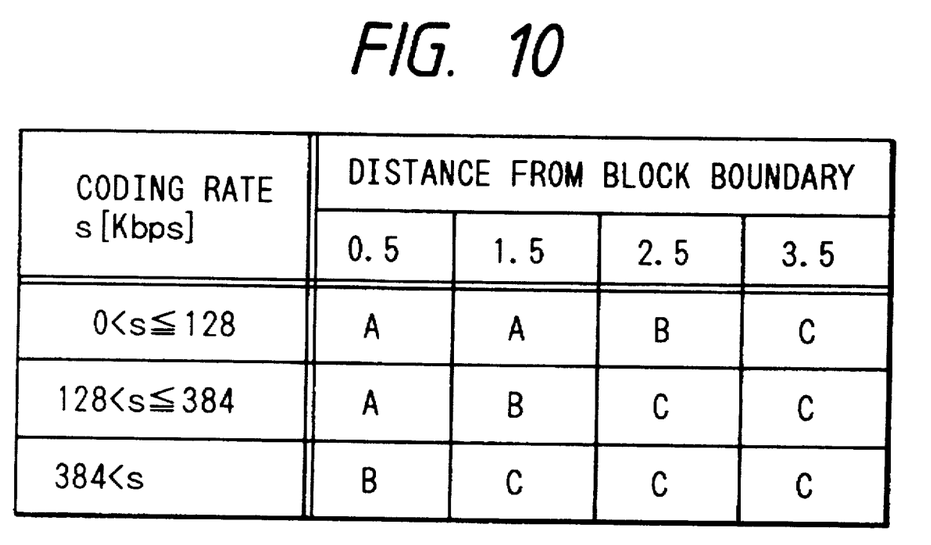
FIG. 10 is a table showing the relations among the distances from the block boundary, the coding rate, and the second ranks A, B, and C of the smoothing process in the embodiment.

Reference numeral 156 denotes a multiplier setting circuit for setting the multipliers α, β, and γ of the multipliers 140, 142, and 144 in accordance with the distance from the block boundary that is generated from the distance calculation circuit 150 and the coding rate which is supplied from the input terminal 118. Specifically, the multiplier setting circuit 156 determines the ranks A, B, and C of the smoothing process in accordance with a table shown in FIG. 10, and supplies the multipliers α, β, and γ according to the decided ranks to the multipliers 140, 142, and 144. As a position is close to the block boundary and as a coding rate is low, a degree of smoothing is increased. On the contrary, as a position is away from the block boundary and a coding rate is high, a degree of smoothing is decreased.

FIG. 7 shows the distances from the block boundary to each pixel on a unit basis of one pixel width in the case where the image is divided into blocks of a size of 8 pixels×8 pixels. FIG. 7 shows a block at an arbitrary position in the image frame. Each of M of the X coordinate and N of the Y coordinate is set to a multiple of 8.

The operations of the circuits 150, 152, and 156 will now be described in detail. The distance calculation circuit 150 calculates the distance from the block boundary on the basis of the values of x and y of the X and Y coordinates from the input terminals 112 and 114 in accordance with the following equation. That is, The distance from the block boundary=$MIN|x_1, x_2, y_1, y_2|+0.5$ $x_1$=(X coordinate) % (block width in the X direction)
$x_2$=(block width in the X direction)−1−$x_1$
$y_1$=(Y coordinate) % (block width in the Y direction)
$y_2$=(block width in the Y direction)−1−$y_1$ MIN[ , , , ] denotes an operator − selected minimum value among four elements shown in []. % allows an operator to obtain a remainder by an integer arithmetic operation. In the embodiment, since the block width in each of the X and Y directions is equal to 8, the above equation is simplified as follows.

Distance from the block boundary=$MIN|x\% 8, 7-x\% 8, y\% 8, 7-y\% 8|+0.5$

The distance calculation circuit 150 supplies a signal indicative of the calculated distance value to the comparison circuit 152 and the multiplier setting circuit 156.

The comparison circuit 152 compares the distance from the block boundary (which is generated from the distance calculation circuit 150) and the effective distance of the neighboring area (which is supplied from the input terminal 116). When the distance from the block boundary is equal to or smaller than the effective distance of the neighboring area, the circuit 150 generates an ON signal for substitution of the pixel value. When the distance from the block boundary is larger than the effective distance of the neighboring area, an OFF signal for substitution of the pixel value is generated.

The multiplier setting circuit 156 supplies the multipliers α, β, and γ of the initialization to the multipliers 140, 142, and 144 at the initial stage. Each time the distance from the block boundary which is supplied from the distance calculation circuit 50 or the coding rate that is supplied from the input terminal 118 is changed, the multipliers α, β, and γ (corresponding to the smoothing processing ranks A, B, and C which are determined by a lookup tables shown in FIGS. 9 and 10) are supplied to the multipliers 140, 142, and 144. That is, the ranks A, B, and C for the smoothing process are first determined in accordance with the table shown in FIG. 10. The multipliers α, γ, and γ of the multipliers 140, 142, and 144 are decided in accordance with the determined ranks with reference to the table of FIG. 9.

The two-dimensional spatial filter comprising the delay circuits 120 to 134, adders 136 and 138, multipliers 140, 142, and 144, and adder 146 calculates the new pixel values which were smoothed in accordance with the multipliers α, β, and γ of the coordinates (x, y), and transfers them from the output terminal 148 to the circuit at the post stage.

For example, a switch to select either the output of the output terminal 148 or the pixel value of the coordinates (x, y) which is not smooth-processed is provided, and the switching operation of this switch is controlled by a substitution control signal that is supplied from the output terminal 154. Due to this, it is possible to execute the selective smoothing process such that although the smoothed pixel value is used in the neighboring area of the block boundary, the pixel value which is not smooth-processed is used in a portion out of the neighboring area. Further, by changing the effective distance which is sent to the input terminal 116, the width of the neighboring area to be smoothed can be arbitrarily selected. By adjusting the width of the neighboring area in accordance with the block size, it is possible to automatically cope with an arbitrary block size.

Figure 11:
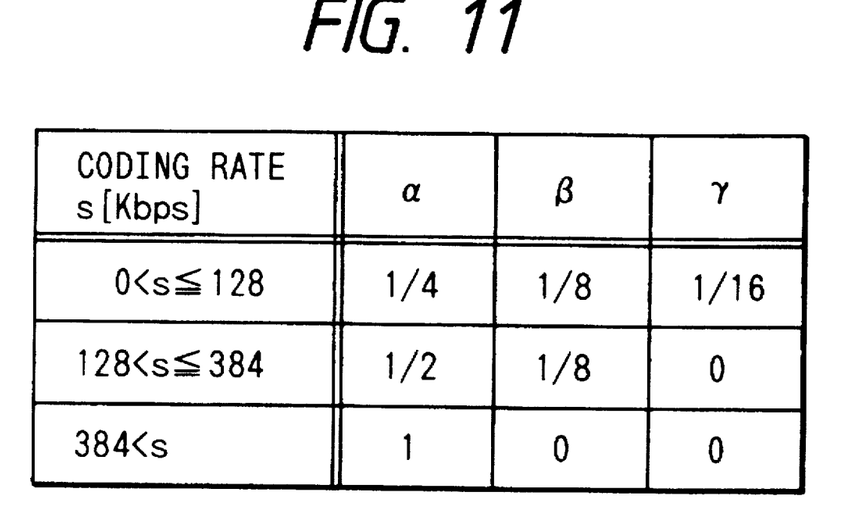
FIG. 11 is a table in case of deciding the coefficients (multipliers) $\alpha$, $\beta$, and $\gamma$ for only the coding rates.
Figure 12:
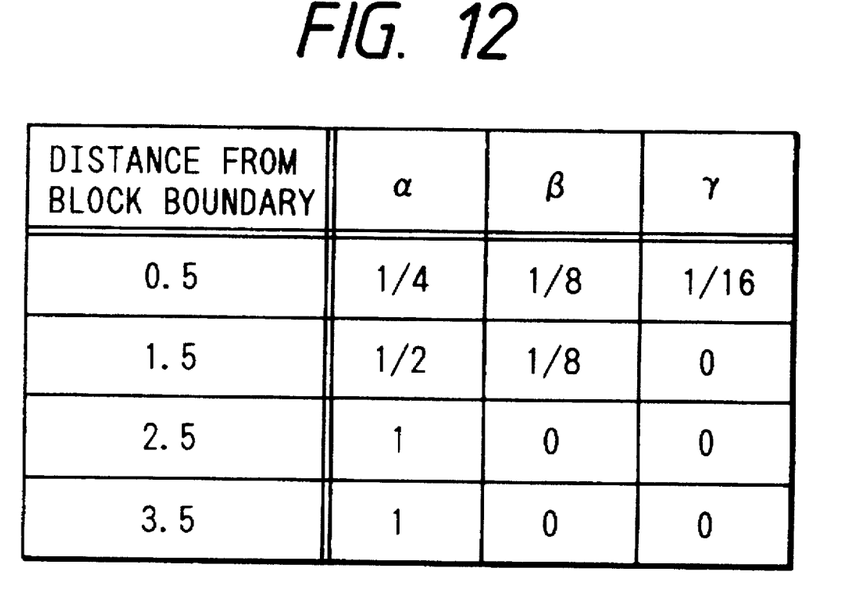
FIG. 12 is a table showing the coefficients (multipliers) $\alpha$, $\beta$, and $\gamma$ for the distances from the block boundary.

In the second embodiment, the multiplier setting circuit 156 has selected and set the multipliers α, β, and γ in accordance with the distance from the block boundary and the coding rate. However, as a simpler method, the multipliers α, β, and γ can be decided in accordance with only the coding rate or only the distance from the block boundary. FIG. 11 shows a determination table in the case of deciding the multipliers α, β, and γ in accordance with only the coding rate. FIG. 12 shows a determination table in the case of deciding the multipliers α, β, and γ in accordance with only the distance from the block boundary. In the case of FIG. 12, the input terminal 118 is obviously unnecessary.

As will be easily understood from the above description, according to the second embodiment, since the filter coefficients of the two-dimensional spatial filter are selected in accordance with the coding rate and/or the distance from the block boundary, the smoothing process of a proper degree can be finely executed for the necessary pixel. Thus, block distortion can be effectively eliminated. In other words, a blur of the image due to an excessive smoothing process doesn't occur.

What is claimed is:

1. Image communicating apparatus for processing image data transmitted through a transmission line, the transmission rate of the image data being variable, comprising:

receiving means for receiving the image data;

discriminating means for discriminating the transmission rate of the image data received by said receiving means;

display processing means for executing a process for displaying the image data received by said receiving means; and control means for changing a process of said display-processing means in accordance with the transmission rate discriminated by said discriminating means.

2. An apparatus according to claim 1, wherein said control means controls a display size of the received image data.

3. An apparatus according to claim 2, wherein when the transmission rate discriminated by said discriminating means is low, said control means sets the display size of the received image data to a value smaller than that in a case where the transmission rate is high.

4. An apparatus according to claim 1, wherein said control means changes smoothing characteristics of the received image data in accordance with the transmission rate discriminated by said discriminating means.

5. An apparatus according to claim 1, wherein the received image data is moving image data.

6. An apparatus according to claim 1, wherein the received image data comprises image data adapted to the H.261 standard.

7. An apparatus according to claim 1, further comprising:

reproducing means for reproducing the received image data as a visible image.

8. Image communicating apparatus for processing image data transmitted through a transmission line, a transmission rate of the image data being variable, comprising:

receiving means for receiving the image data;

discriminating means for discriminating the transmission rate of the image data received by said receiving means;

image size discriminating means for discriminating an image size of an image corresponding to the image data received by said received means; and conversion means for converting a display size of the image corresponding to the received image data in response to an output of said discriminating means and an output of said image size discriminating means.

9. An apparatus according to claim 8, further comprising:

visible image display means for displaying the received image data as a visible image.

10. Apparatus according to claim 8, further comprising display means for displaying the image converted by said conversion means.

11. Image processing apparatus for processing image data transmitted through a transmission line, a transmission rate of the image data being variable, comprising:

receiving means for receiving the image data;

discriminating means for discriminating the transmission rate of the image data received by said receiving means;

smoothing means for smoothing the image data received by said receiving means; and control means for changing a smoothing process of said smoothing means in response to the transmission rate discriminated by said discriminating means.

12. An apparatus according to claim 11, wherein the received image data is block encoded.

13. An apparatus according to claim 12, wherein said smoothing means executes the smoothing process so as to eliminate a block distortion which occurs due to the block encoding.

14. An apparatus according to claim 11, wherein the received image data is moving image data.

15. Apparatus according to claim 11, wherein, when the transmission rate discriminated by said discriminating means is lower than a predetermined value, said control means changes the smoothing process of said smoothing means to a smoothing process which is stronger than a smoothing process used when the transmission rate discriminated by said discriminating means is higher than the predetermined value.

16. Image processing apparatus for processing image data transmitted through a transmission line, a transmission rate of the image data being variable, comprising:

input means for inputting the image data;

discriminating means for discriminating the transmission rate of the image data inputted by said input means; and conversion means for converting an aspect ratio of the inputted image data to a different aspect ratio in response to the transmission rate discriminated by said discriminating means.

17. Apparatus according to claim 16, further comprising display means for displaying an image corresponding to the inputted image data converted by said conversion means.

18. Apparatus according to claim 16, wherein the input image data comprises block-encoded data.

* * * * *

UNITED STATES PATENT AND TRADEMARK OFFICE
CERTIFICATE OF CORRECTION

PATENT NO. :  5,537,150
DATED      :  July 16, 1996
INVENTOR(S):  AKIRA SUGIYAMA, ET AL.

It is certified that error appears in the above-indentified patent and that said Letters Patent is hereby corrected as shown below:

On the title page: Item

[56],
    line FPD, insert --3-46482 2/1991 Japan .... H04N 7/13--.

Column 1,
    line 34, "into" should read --by--; and
    line 38, "end-to-end of" should read --end-to end connection of the--.

Column 3,
    line 37, "second" should be deleted; and
    line 38, "embodiment;" should read --second embodiment;--.

Column 4,
    line 9, "interface 28" should read --interface 28 is provided--;
    line 28, "ten-key" should read --a ten-key--, and "touch" should read --a touch--;
    line 36, "coding decoding" should read --coding/decoding--; and
    line 40, "coding decoding" should read --coding /decoding--.

Column 5,
    line 47, "signal) and an audio signal" should read --signal and an audio signal)--.

UNITED STATES PATENT AND TRADEMARK OFFICE
CERTIFICATE OF CORRECTION

PATENT NO. : 5,537,150
DATED : July 16, 1996
INVENTOR(S) : AKIRA SUGIYAMA, ET AL.

It is certified that error appears in the above-indentified patent and that said Letters Patent is hereby corrected as shown below:

Column 6,
    line 2, "in" should be deleted;
    line 36, "into" should read --by--; and
    line 52, "into the" should read --into--.
Column 7,
    line 16, " into the" should read --into an--, and an NTSC" should read --the NTSC--;
    line 25, "the size," should read --full size,--;
    line 32, "user designated" should read --user-designated--; and
    line 48, "embodiment," should read --first embodiment,--, and "first size" should read --size--.
Column 8,
    line 66, "comprises" should read --comprise--.
Column 10,
    line 26, "by a" should read --by--; and
    line 30, "$\alpha, \Upsilon,$" should read --$\alpha, \beta,$--.
Column 12,
    line 22, "block encoded" should read --block-encoded--; and
    line 25, "block" should read --block- --.

Signed and Sealed this

Seventh Day of January, 1997

Attest:

BRUCE LEHMAN

*Attesting Officer*    *Commissioner of Patents and Trademarks*